US010356164B2

United States Patent
Botea et al.

(10) Patent No.: US 10,356,164 B2
(45) Date of Patent: Jul. 16, 2019

(54) LOAD BALANCING FOR POINTS OF INTEREST

(71) Applicant: INTERNATIONAL BUSINESS MACHINES CORPORATION, Armonk, NY (US)

(72) Inventors: Adi Ionel Botea, Dublin (IE); Stefano Braghin, Dublin (IE); Akihiro Kishimoto, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 276 days.

(21) Appl. No.: 14/982,532

(22) Filed: Dec. 29, 2015

(65) Prior Publication Data

US 2017/0187788 A1    Jun. 29, 2017

(51) Int. Cl.
*H04L 29/08* (2006.01)
*H04L 12/911* (2013.01)
*H04W 4/02* (2018.01)

(52) U.S. Cl.
CPC ........ *H04L 67/1002* (2013.01); *H04L 47/824* (2013.01); *H04L 67/02* (2013.01); *H04L 67/18* (2013.01); *H04L 67/306* (2013.01); *H04L 67/34* (2013.01); *H04W 4/02* (2013.01)

(58) Field of Classification Search
CPC ..... H04L 67/1002; H04L 67/02; H04L 67/18; H04L 67/306; H04L 67/34; H04W 4/02
USPC ....... 709/226; 705/14.64, 14.73, 14.16, 7.13, 705/14.49; 455/414.2, 411, 456.3
See application file for complete search history.

(56) References Cited

U.S. PATENT DOCUMENTS

| 8,527,347 | B2 | 9/2013 | Pulijala et al. | |
|---|---|---|---|---|
| 8,666,989 | B1* | 3/2014 | Gilliam | G06Q 30/0251 705/14.1 |
| 8,813,126 | B1 | 8/2014 | Flickinger et al. | |
| 2005/0119011 | A1* | 6/2005 | Sakamoto | H04W 4/02 455/456.3 |
| 2008/0154673 | A1 | 6/2008 | Connolly et al. | |
| 2009/0076912 | A1* | 3/2009 | Rajan | G06Q 30/02 705/14.64 |
| 2009/0083150 | A1* | 3/2009 | Mashinsky | G06Q 30/02 705/14.73 |

(Continued)

OTHER PUBLICATIONS

Qiu, Y. Q., Peng Ge, and P. Y. Ren. "A study on temporal and spatial navigation based on the load-balance of tourists in Jiuzhaigou Valley."Resources Science 32.2 (2010): 118-123.

(Continued)

*Primary Examiner* — Thuong Nguyen
(74) *Attorney, Agent, or Firm* — F. Chau & Associates, LLC (57) ABSTRACT

A method of point of interest (POI) load balancing includes storing load profile data of a plurality of POIs, monitoring a position of a mobile device, determining an arrival of the mobile device at a first POI of the plurality of POIs, measuring a duration of stay of the mobile device at the first POI, determining whether the duration of stay of the mobile device at the first POI exceeds a preset time threshold for the first POI, and sending an incentive for a second POI of the plurality of POIs to the mobile device upon the mobile device exceeding the preset time threshold for the first POI.

20 Claims, 6 Drawing Sheets

(56) References Cited

U.S. PATENT DOCUMENTS

| | | | | | |
|---|---|---|---|---|---|
| 2010/0257038 | A1* | 10/2010 | Shipley | | G06Q 30/02 705/14.16 |
| 2012/0309350 | A1* | 12/2012 | Kim | | H04W 12/02 455/411 |
| 2013/0167196 | A1* | 6/2013 | Spencer | | H04W 8/22 726/3 |
| 2014/0032336 | A1* | 1/2014 | Kokubo | | G06Q 30/0277 705/14.73 |
| 2014/0089142 | A1* | 3/2014 | Jackovin | | G06Q 30/0281 705/26.61 |
| 2014/0244385 | A1* | 8/2014 | Choi | | G06Q 30/0261 705/14.52 |
| 2015/0379539 | A1* | 12/2015 | Akin | | G06Q 30/02 705/7.34 |

OTHER PUBLICATIONS

Ge, Peng, et al. "A Simulation study based on the regional space-time load balancing of Jiuzhaigou." Journal of Industrial Engineering and Engineering Management 27.2 (2013): 115-124.

Leong, Aliana MW, and Xi Li. "A study on tourist management in China based on Radio Frequency Identification (RFID) technology." Digital Culture and E-Tourism: Technologies, Applications and Management Approaches: Technologies, Applications and Management Approaches (2010): 190.

Lin, Shaojiang, et al. "Evaluation Model Construction and Simulation Research on Tourist Diversion Strategy in Ecotourism Scenery Sport." Appl. Math 7.6 (2013): 2249-2257.

Jin, Maozhu, Di Zheng, and Peiyu Ren. "Application of RFID Based Low-Carbon Scenic Integrated Management System in Jiuzhaigou Area."Proceedings of the Seventh International Conference on Management Science and Engineering Management. Springer Berlin Heidelberg, (2014).

Zheng, Weimin, et al. "The Simulation Study of Space-Time Shunt in Jiuzhaigou Based on Bottleneck Theory." Applied Mathematics & Information Sciences 6.3 (2012): 993-1000.

Mamei, Marco, and Franco Zambonelli. "Field-based Approaches to Adaptive Motion Coordination in Pervasive Computing Scenarios." in "Handbook of Algorithms for Mobile and Wireless Networking and Computing" CRC Handbook (2004).

Mell, Peter, and Tim Grance. "The NIST definition of cloud computing." (2011).

* cited by examiner

LOAD BALANCING FOR POINTS OF INTEREST

BACKGROUND

The present invention relates to load balancing, and more specifically, to systems and methods of load balancing for points of interest (POIs).

When traveling out of town, travelers generally visit POIs located in the area that they are visiting. Generally, the travelers make lists of POIs that they would like to visit while staying at a particular city or area. Far too often, the travelers stay at a particular POI for extended periods of time. The extended stay at a POI may cause the POI to become overcrowded, which in turn, may cause a decreased enjoyment of the travelers' experience at the POI. In addition, the travelers may end up visiting fewer POIs than originally intended.

SUMMARY

According to an exemplary embodiment of the present invention, a method of point of interest (POI) load balancing includes storing load profile data of a plurality of POIs, monitoring a position of a mobile device, determining an arrival of the mobile device at a first POI of the plurality of POIs, measuring a duration of stay of the mobile device at the first POI, determining whether the duration of stay of the mobile device at the first POI exceeds a preset time threshold for the first POI, and sending an incentive for a second POI of the plurality of POIs to the mobile device upon the mobile device exceeding the preset time threshold for the first POI.

According to an exemplary embodiment of the present invention, a system for POI load balancing includes a mobile device and a server. The mobile device includes a processor, a display, a wireless transceiver, and a stored program. The stored program has codes executable by the processor to determine a current position of the mobile device, determine an arrival of the mobile device at a first POI, measure a duration of stay of the mobile device at the first POI, determine whether the duration of stay of the mobile device at the first POI exceeds a preset time threshold for the first POI, and present at a display of the mobile device an incentive for a second POI upon the mobile device exceeding the preset time threshold for the first POI. The server includes a memory that stores load profile data of a plurality of POIs, a processing device that updates the load profile data of the plurality of POIs, and a communicator that communicates with the wireless transceiver of the mobile device and transmits an incentive for a second POI to the mobile device based on the updated load profile data of the plurality of POIs.

According to an exemplary embodiment of the present invention, a stored program executable by a processor in a mobile device performs a method of POI load balancing. The method of load balancing includes storing load profile data of a plurality of POIs, monitoring a current position of the mobile device, determining an arrival of the mobile device at a first POI, measuring a duration of stay of the mobile device at the first POI, determining whether the duration of stay of the mobile device at the first POI exceeds a preset time threshold for the first POI, and presenting an incentive for a second POI at a display of the mobile device upon the mobile device exceeding the preset time threshold for the first POI.

BRIEF DESCRIPTION OF THE DRAWINGS

The above and other features and aspects of the inventive concept will become more apparent by describing in detail exemplary embodiments thereof with reference to the accompanying drawings, in which.

DETAILED DESCRIPTION

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Figure 1:
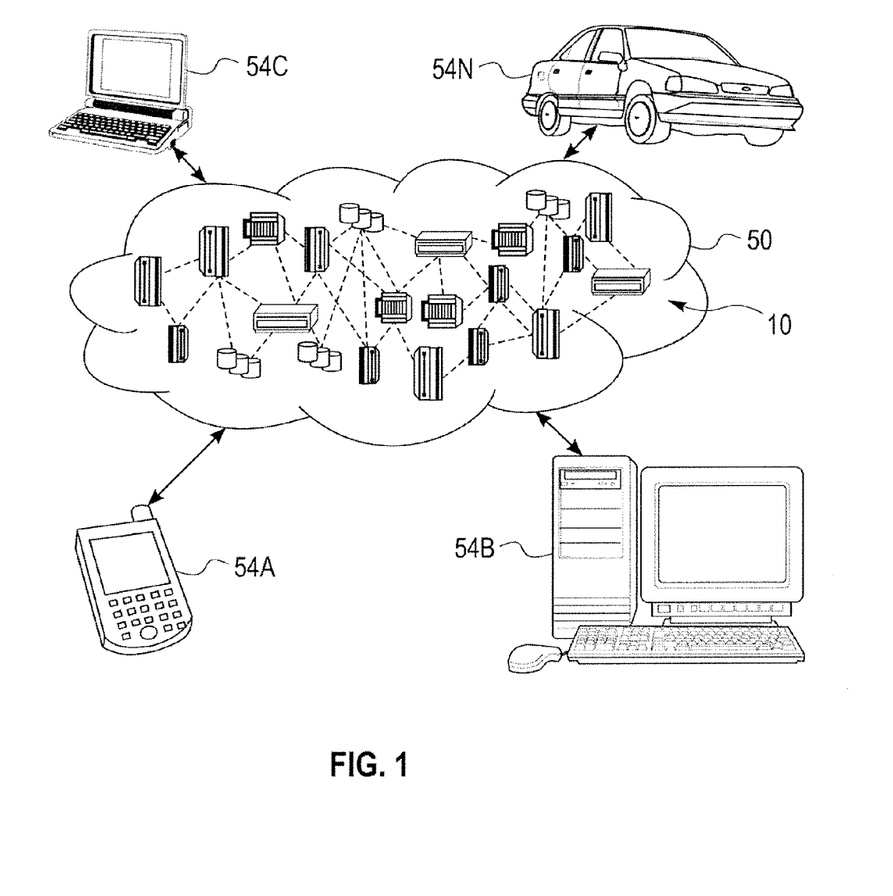
FIG. 1 illustrates a cloud computing environment according to an embodiment of the present invention.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A cloud computing environment is service oriented with a focus on statelessness, low coupling, modularity, and semantic interoperability. At the heart of cloud computing is an infrastructure comprising a network of interconnected nodes. Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
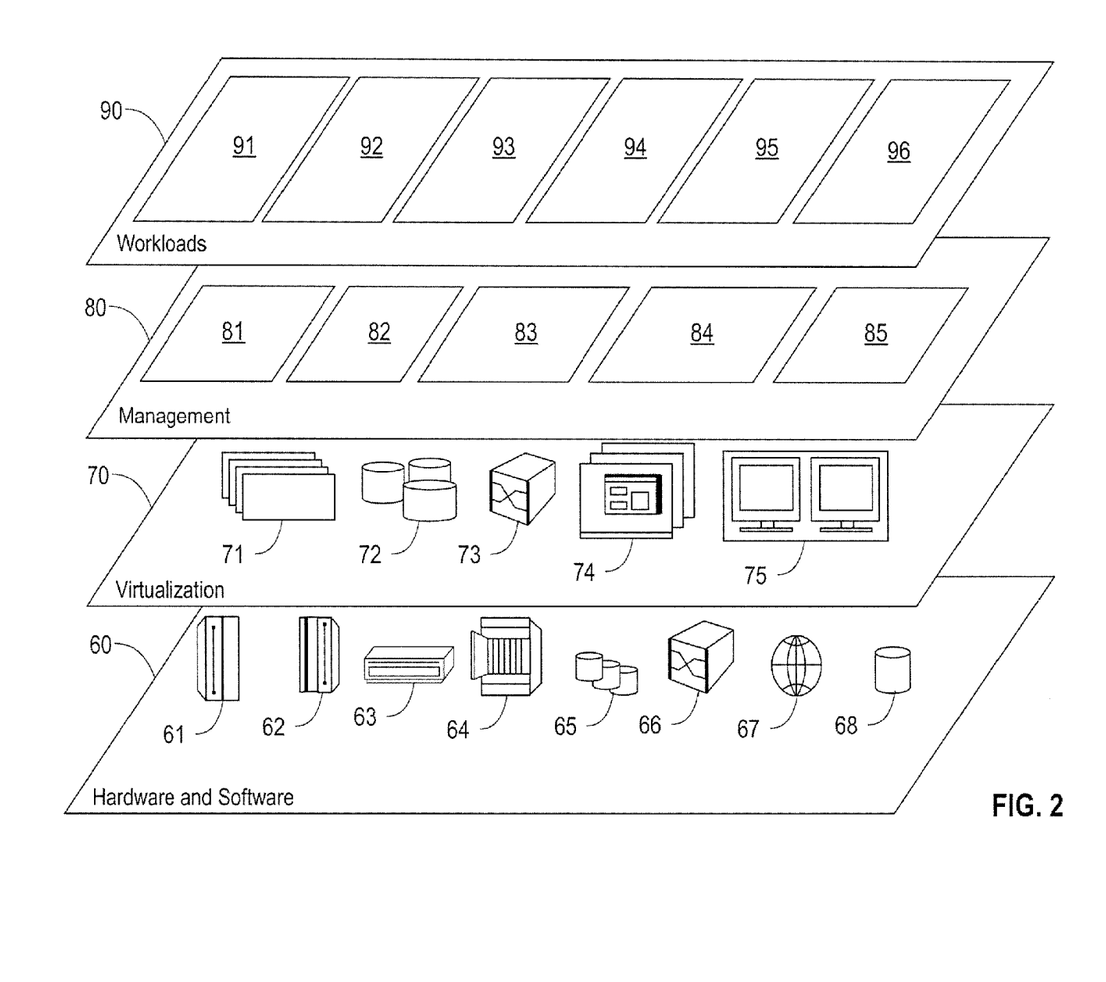
FIG. 2 depicts abstraction model layers according to an embodiment of the present invention, which may be used to implement a validator processing unit.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a load balancing processing unit 96. The functions performed by server 220, which will be discussed below in more detail with respect to FIGS. 3A, 3B, and 4-5 may be performed by the load balancing unit 96.

The descriptions of the various exemplary embodiments of the present invention have been presented for purposes of illustration, but are not intended to be exhaustive or limited to the exemplary embodiments disclosed. Many modifications and variations will be apparent to those of ordinary skill in the art without departing from the scope and spirit of the described exemplary embodiments. The terminology used herein was chosen to best explain the principles of the exemplary embodiments, or to enable others of ordinary skill in the art to understand exemplary embodiments described herein.

In accordance with an exemplary embodiment of the present invention, users located in crowded points of references (POIs) may be distributed to other less crowded POIs or to stores, bars, cafes, restaurants, or the like, located near the crowded POIs. A POI may be a popular visitation destination, for example, the Trevi Fountain in Rome.

The system and method may include inputting one or more POIs, load profile data for the POIs (e.g., how crowded the POIs are at different times of year and at different times of the day) and incentives designed to encourage users to leave the crowded POI in which they are located and go to a less crowded POI or to a business or other establishment located near the crowded POI.

A software program (program) may be downloaded from a server into a user's mobile device. The program may be advertised in airports, train or bus terminals, or the like, of a particular city. A user arriving into the airport, train or bus terminal, or the like, may see the advertisement for the program and download the program from the server. The program may be used to distribute users of mobile devices running the program from crowded POIs to less crowded POIs.

The location of the user is tracked using the user's mobile device, which may be one of a smartphone, tablet computer, laptop computer, smart wearable device, and the like. When the user enters a POI, the time that the user spends at the POI is measured. When the POI is crowded, and the user stays at the crowded POI for a longer period of time than a threshold time, the user may receive an incentive in his or her mobile device to go elsewhere. If the user accepts the incentive, the location of the user may be tracked to determine whether the user is headed toward the location for which the incentive is valid (e.g., the location of the incentive). When the user heads toward the location of the incentive, the incentive remains valid. Otherwise, the incentive is canceled. The user may take advantage of the incentive when arriving at the location of the incentive.

Figure 3A:
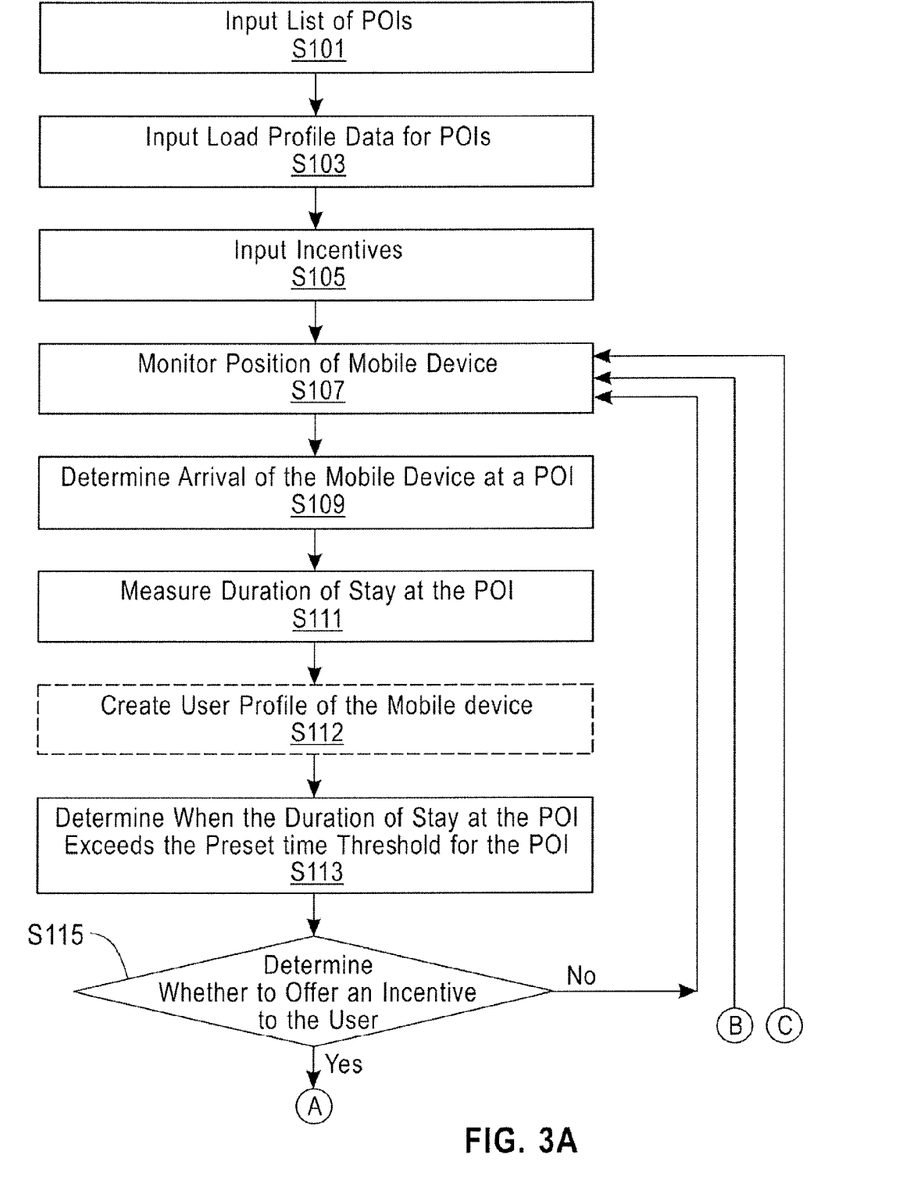
FIGS. 3A and 3B illustrate a flowchart of a method of point of interest (POI) load balancing, according to an exemplary embodiment of the present invention.
Figure 3B:
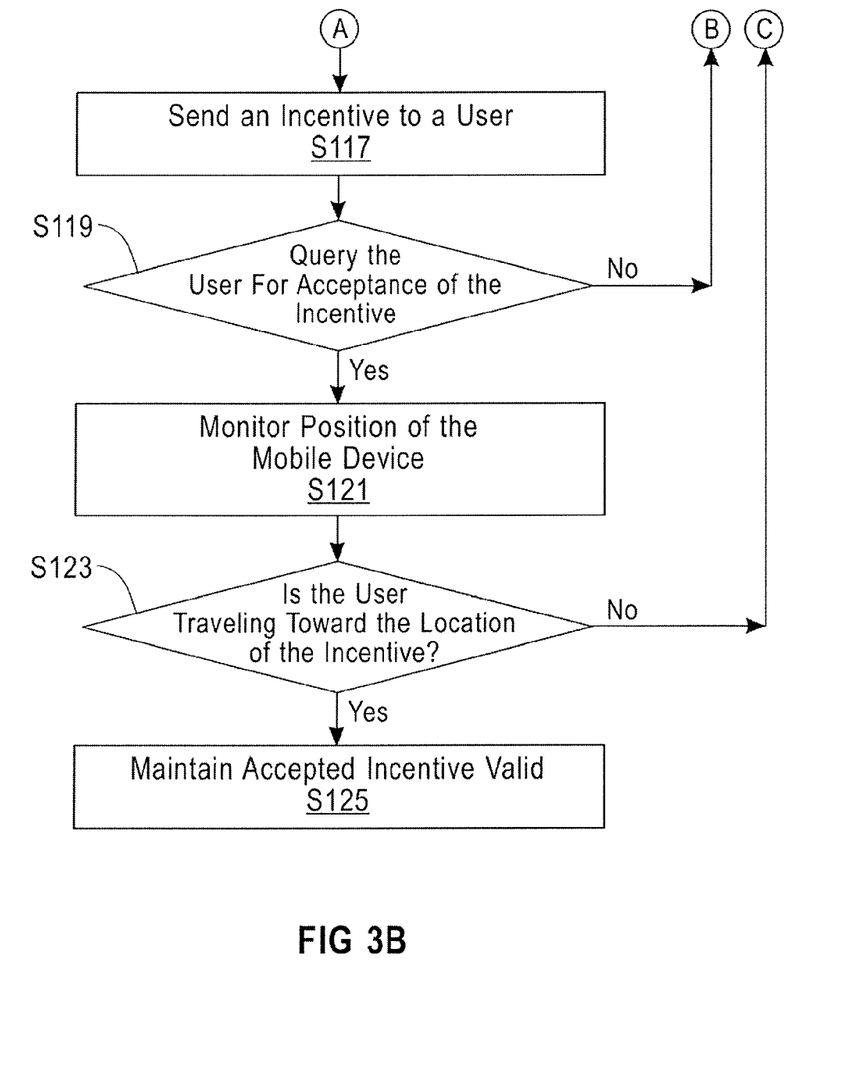

FIGS. 3A and 3B illustrate a flowchart of a method of POI load balancing, according to an exemplary embodiment of the present invention.

Referring to FIG. 3A, in operation S101, a list of POIs is input. The list of POIs includes one or more POIs. Each POI may include information such as a name of the POI and a geographical location of the POI. The name of a POI may be, for example, the Acropolis, the Louvre, or the like. The geographical location of a POI may include GPS coordinates and/or a street address of the POI. The geographical location of a POI may include GPS coordinates of a point location where the POI is located, GPS coordinates of an outer perimeter of the POI, or the like. For example, the Bridge of Sighs in Venice may be represented by a GPS point location. The Coliseum in Rome may be represented by GPS coordinates of an outer perimeter of the Coliseum.

In addition, the list of POIs includes a preset time threshold for each POI. The preset time threshold is a predetermined amount of time to be spent at a POI that is opined to be sufficient for enjoying an experience at the POI. The preset time thresholds of the POIs may be different from each other. For example, the preset time threshold for the Sagrada Familia in Barcelona may be 30 minutes, the preset time threshold for the Trevi Fountain in Rome may be 20 minutes, and the like.

The list of POIs may further include threshold load data for each respective POI. The threshold load data of a POI is a predetermined occupancy level of the POI that can be used to determine whether the POI is overcrowded. The threshold load data of a POI may be a ratio of actual persons present at a POI to a maximum number of persons that can be present at the POI according to local governing guidelines. For example, the threshold load data of the Trevi Fountain in Rome may be set at 75%. The threshold load data may be different for each POI. In addition, the threshold load data of the POIs may be based on historical load data for the respective POIs. For example, the threshold load data for a POI may be set at an intermediate occupancy level of that POI.

In an exemplary embodiment of the present invention, the list of POIs includes POIs for a limited geographical area of the globe, for example, a city, town, village, rural area, or the like. For example, the list of POIs for Rome may include the Coliseum, the Trevi Fountain, and other POIs. In an exemplary embodiment of the present invention, the list of POIs includes POIs for the entire globe.

In an exemplary embodiment of the present invention, the list of POIs is stored in a server. In an exemplary embodiment of the present invention, the list of POIs is transmitted from the server to a mobile device of a user that is communicatively coupled to the server, and may be stored in the mobile device. In an exemplary embodiment of the present invention, the server is communicatively coupled to one or more mobile devices.

In operation S103, load profile data is input for each POI included in the list of POIs. For each POI, the load profile data may include a capacity of the POI and an actual occupancy of the POI at a given point in time. The capacity of a POI may include a number of persons that can be present at the POI at the same time, for example, a maximum number of persons that can be present at the POI according to local governing guidelines, a maximum number of persons that can fit at the POI, a desired maximum number of people present at the POI, or the like. The actual occupancy of the POI may be the number of persons actually present at the POI at a particular time of the day or night. The load profile data may be different for each POI.

In operation S103, in an exemplary embodiment of the present invention, the load profile data for each POI is input and is continuously updated in real-time by monitoring the POIs. For example, the actual occupancy of a POI may be continuously updated based on real-time observation of that POI. In an exemplary embodiment of the present invention, in operation S103, the load profile data for each POI is input and is updated at various points in time throughout a day or night by monitoring the POI. The monitoring of the POIs may be by official count of persons entering a POI or by camera surveillance of the POIs.

In an exemplary embodiment of the present invention, in operation S103, the load profile data is stored and updated as described above in a server. In an exemplary embodiment of the present invention, in operation S103, the load profile data stored and updated in the server is transmitted to and stored in a user's mobile device.

In an exemplary embodiment of the present invention, in operation S103, the load profile data for each POI may be based on historical data for the POIs. The historical data may include historical load profile data for each POI for different times of the day for each day of the year. For example, based on the historical data for the Trevi Fountain in Rome, the load profile data for the Trevi Fountain during a summer day may be at a low level in the morning, then gradually increase to an intermediate level around, for example, 11 a.m., peak around 1 p.m., and then gradually decrease for the remainder of the day.

One or more incentives are input in operation S105. An incentive is an offer for goods or services at favorable terms.

For example, an incentive may be an offer for a reduced admission fee at another POI, an offer for a reduced-cost meal at a particular restaurant, an offer for a reduced-cost object at a store, or the like. Each incentive may include the name of its featured POI or other establishment, a location (e.g., GPS coordinates and/or street address) of the featured POI or other establishment, a type of goods or services offered or featured, an advertised (e.g., reduced) cost for the offered goods or services, the typical full cost for the offered goods or services, a calculated discount percentage for the offered goods or services based on the advertised cost and the full cost, and the like. In addition, each incentive may also include a period of time for which it is valid.

For example, an incentive may include an offer to enter the Gaudi House Museum at Guell Park in Barcelona for half-price on a particular day of the week between noon and 3 p.m., an offer to dine at a restaurant near the Trevi Fountain in Rome on Mondays and Wednesdays between 2 p.m. and 7 p.m. at a 40% discount, or the like. It is understood that the above incentives are merely exemplary.

In an exemplary embodiment of the present invention, the incentives correspond to geographical locations of the POIs input in operation S101. For example, if the POIs input in operation S101 are POIs located in Rome, the incentives input in operation S105 are incentives for goods located in Rome or for services to be performed in Rome. The goods may include objects sold in stores and the services may include access to POIs, dinner served at restaurant, and the like.

In operation S107, a position of a mobile device in the possession of a user (e.g., a tourist) is determined using GPS tracking or triangulation of the mobile device. The position of the mobile device may be continuously determined. The mobile device may be a smartphone, a tablet computer, a laptop computer, a wearable device such as a smart watch, or the like.

In operation S109 the arrival of a user's mobile device at a POI is determined when the GPS position of the user's mobile device falls inside an area formed by the GPS coordinates of the outer perimeter of the POI, or when a distance between the GPS position of the user's mobile device and the GPS position of the point where the POI is located becomes small, for example, 10 feet, depending on whether the POI is denoted by a GPS point location or GPS outer perimeter coordinates.

In operation S111, the duration of stay of a user at a particular POI is measured starting when the user's mobile device arrives at the POI. This is done by tracking the position of the user's mobile device. The measuring of the user's duration of stay continues while the user's mobile device stays within a preset proximity zone of the POI.

In operation S112 a user profile of a mobile device is created. The user profile of the mobile device may include the travel behavior including POI locations visited by the mobile device at what times of day or month, the types of POIs, the duration of stay of the mobile device at each POI location, and the like. The user profile may be stored in the respective mobile device and it may be transmitted to the server and stored in the server. In an exemplary embodiment of the present invention, the user profile created in operation S112 is stored in the respective mobile device but not in the server. In operation S112, a user profile may be created for each mobile device that is communicatively coupled to the server and retrieved by the server. In an exemplary embodiment of the present invention, operation S112 is optional or not performed.

In operation S113, the duration of stay of a user at a POI is compared with the preset time threshold for that POI to determine when the duration of stay of the user at that POI exceeds the preset time threshold for that POI. When the duration of stay of a user at a particular POI exceeds the preset time threshold for that particular POI, the method of POI load balancing proceeds to operation S115.

In operation S115, it is determined whether to offer (e.g., send) an incentive to a user whose duration of stay at a POI exceeds the preset time threshold for that POI. The determination to offer an incentive to a user is made by considering the load profile data for POIs input in operation S103, the number of incentives input in operation S105, an availability of incentives suitable for that POI at that time of the day or night, and a number of users qualifying for the incentives.

In an exemplary embodiment of the present invention, the chance that a user receives an incentive is the highest when the time spent at the current POI reaches the preset time threshold. Afterwards, the chance of receiving an incentive decreases sharply as more time passes. This discourages users from staying too long at a POI on purpose, hoping to eventually receive an incentive.

The availability of incentives suitable for a POI at a time of the day or night may include considering the type of the incentive to be offered, the distance between the user and the location of the incentive, the time period for which the incentive is valid, traffic conditions to the location of the incentive, and the like. A suitable incentive may be an incentive including a geographical location that a user may reach while the inventive is valid, (e.g., before the incentive expires).

In addition, to offer an incentive to a user, the load profile data for the POI in which the user is located may be equal to or greater than the threshold load data for that POI. The load profile data of POIs, including the POI in which the user is located, may be updated in real-time or at various time intervals. The updated load profile data for all POIs may be input into the server. In some cases, however, the load profile data for the POI in which the user is located may be below the threshold load data for that POI. However, since the load profile data for the POI in which the user is located may be updated in real time or at various time intervals, the updated load profile data for the POI may be equal to or greater than the threshold load data for that POI at later time. Accordingly, in an exemplary embodiment of the present invention, the determination to offer an incentive to a user may be based on the updated load profile data for the POI in which the user is located.

In an exemplary embodiment of the present invention, the determination to offer an incentive to a user is made by considering the number of available incentives, the availability of incentives suitable for that POI at that time of the day or night, the number of users qualifying for the incentives, and the user profile of the mobile device.

In an exemplary embodiment of the present invention, when it is determined to not offer an incentive to the user, the method of POI load balancing returns to operation S107.

Referring to FIG. 3B, in operation S117, an incentive is sent to a user. The incentive that is sent to the user may be one of the available incentives that were determined to be a suitable incentive for the POI where the user is located in operation S115. In an exemplary embodiment of the present invention, selecting which incentive to offer to the user, from among the available incentives that were determined to be suitable for the POI where the user is located, includes considering the user profile of the mobile device of the user.

For example, when the user profile of the mobile device of a particular user indicates that the user has frequented POIs of ancient ruins, and the available incentives for the user include POIs that feature ancient ruins and POIs that feature modern features, the incentive for the POI that features ancient ruins may be sent to the user.

Selecting which incentive to send to a user may include considering the load profile data for the POIs located in the same area (e.g., same town, city, village, rural area, or the like) as the user. For example, when a user is located at a first POI and the load profile data for a second POI located near the first POI indicates that the second POI has a low load profile data (e.g., the load profile data for the second POI is lower than the threshold load data for the first POI), the user may be sent an incentive for the second POI based on the low load profile data of the second POI. Since the load profile data for all the POIs in the area where the user is located may be updated, the selection of the incentives sent to a user may include considering the updated load profile data for all the POIs.

In an exemplary embodiment of the present invention, a user may be offered an incentive for a POI that is different from the POI in which the user is currently located. In an exemplary embodiment of the present invention, a user may be offered an incentive for a store, café, restaurant, bar, or the like.

The incentives may be displayed on a display of a user's mobile phone.

In operation S119, the user is queried whether he or she would like to accept the sent incentive. If the user rejects the sent incentive, the method of POI load balancing may proceed to operation S107. In an exemplary embodiment of the present invention, the method of POI load balancing may terminate when the user rejects the sent incentive.

In operation S121, the position of a user's mobile device is monitored to determine whether the user is traveling to the location of the incentive that the user accepted. The location of the user's mobile device may be continuously monitored. In an exemplary embodiment of the present invention, the user may be provided with directions to the location of the incentive that the user accepted.

In operation S123, when it is determined that the user is traveling toward the location of the incentive, the incentive is maintained valid. In this case, the user may use the incentive when arriving at the location of the incentive, (e.g., the different POI, store, bar, café, restaurant, or the like).

However when it is determined that the position of the user's mobile device is not changing (e.g., the user remains at the current POI) or that the user's mobile device is moving away from the location of the incentive, the user's incentive is revoked. The revoked incentive may be re-input into the incentives input in operation S105 to be available to other users. In an exemplary embodiment of the present invention, the method of POI load balancing may terminate when the user remains at the current POI or travels to a location other than that of the incentive which he or she accepted. In an exemplary embodiment of the present invention, the method of POI load balancing may proceed to operation S107 when the user remains at the current POI or travels to a location other than that of the incentive which he or she accepted.

According to an exemplary embodiment of the present invention, the method of POI load balancing may be applied to a plurality of users that are located in a same city, town, village, rural area, or the like, to which the list of POIs input in operation S101 corresponds. Accordingly, different users may be presented with different incentives depending on each user's location, available incentives, threshold load data for the POIs, preset time threshold for each POI, user profile, and the like, as described above with reference to operations S101 to S125.

According to the method of POI load balancing described with reference to operations S101 to S125 above, users may be incentivized to move away from a crowded POI to a less crowded POI or to a store, bar, café, restaurant, or the like, to shop, eat, or rest. As a result, a load distribution of several POIs of a particular city, village, town, rural area, or the like, may become more balanced. In addition, user enjoyment of their time at the POIs may be maintained at a high level by including preset time thresholds for the POIs that allocate ample time to explore the POIs.

Figure 4:
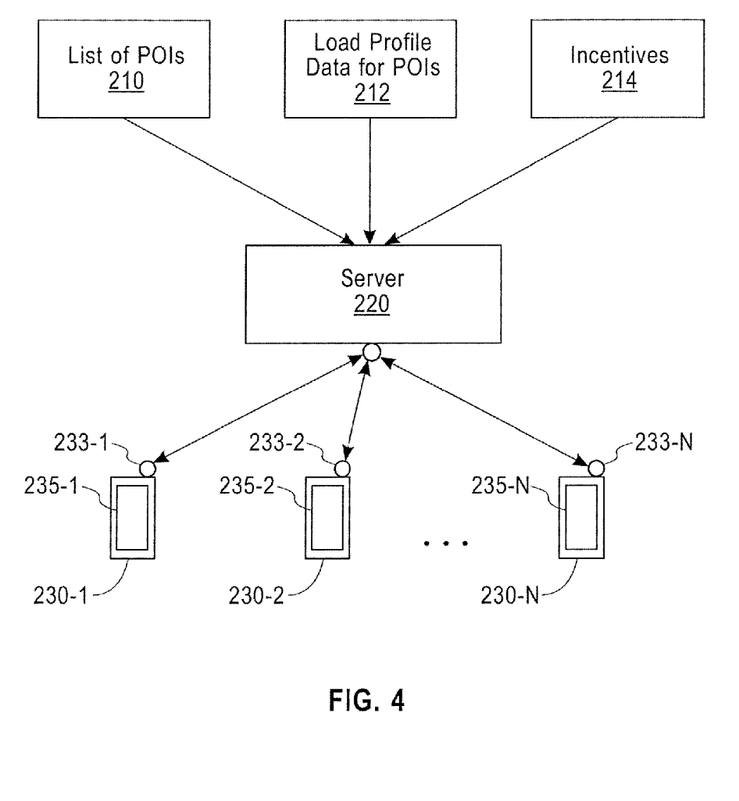
FIG. 4 illustrates a block diagram of a system for POI load balancing, according to an exemplary embodiment of the present invention.

FIG. 4 illustrates a block diagram of a system for POI load balancing, according to an exemplary embodiment of the present invention. The system illustrated in FIG. 4 may perform the operations of the method of POI load balancing described with reference to FIGS. 3A and 3B.

Referring to FIG. 4, the system for POI load balancing includes a list of POIs 210, load profile data for POIs 212, incentives 214, a server 220, and mobile devices 230-1 to 230-N (e.g., N is a natural, non-zero, positive number greater than 1).

The list of POIs 210 may include a list of POIs for a particular, city, town, village, rural area, or the like. In an exemplary embodiment of the present invention, the list of POIs 210 includes POIs for the entire globe. The list of POIs 210 may correspond to the list of POIs input is operation S101 of the method of POI load balancing described with reference to FIGS. 3A and 3B, (method of POI load balancing). Accordingly, the list of POIs 210 may include the preset time thresholds and the threshold load data for the POIs. The list of POIs 210 may be updated at given time intervals to add additional POIs for a particular region, remove POIs for a particular region (e.g., due to seasonal closings), and/or to change the preset time thresholds and the threshold load data for the POIs. The list of POIs 210 may be updated, for example, once a day, once a week, once a month, or the like.

The list of POIs 210 may be updated and stored in the server 220 and may be transmitted from the server 220 to be stored in one or more of the mobile devices 230-1 to 230-N.

The load profile data for POIs 212 may include load profile data for the POIs, for example, the capacity of the POIs and an actual occupancy of the POIs at a given point in time. The capacity and actual occupancy of the POIs may be updated in real-time or at other time intervals (e.g., every hour). The load profile data for POIs 212 may correspond to the load profile data that is input for the POIs input, or based on historical data for the POIs as described in operation S103 of the method of POI load balancing.

The load profile data for POIs 212 may be updated and stored in the server 220 and may be transmitted from the server 220 to be stored in one or more of the mobile devices 230-1 to 230-N.

The incentives 214 may include a plurality of incentives corresponding to the POIs of the list of POIs 210. The incentives 214 may correspond to the incentives input in operation S105 of the method of POI load balancing. The incentives included in the incentives 214 may be updated at a given time interval, for example, every hour, four hours, eight hours, every day, or the like.

The incentives 214 may be updated and stored in the server 220, and may be transmitted from the server 220 to be stored in one or more of the mobile devices 230-1 to 230-N.

The server 220 may be a server or other computer that may store and update the list of POIs 210, the load profile data for POIs 212, and the incentives 214. The server 220 includes a communicator 223, and may be communicatively coupled with the mobile devices 230-1 to 230-N through the communicator 223. The server 220 may continuously receive data from and transmit data to the mobile devices 230-1 to 230-N through the communicator 223. In an exemplary embodiment of the present invention, the server 220 is cloud-based. The server 220, when cloud-based, may be connected to the mobile devices 230-1 to 230-N via the Internet or other wireless communication protocol.

Each of the mobile devices 230-1 to 230-N may be a mobile phone (e.g., a smartphone), a tablet computer, a laptop computer, a wearable device such as a smart watch, or the like. The mobile devices 230-1 to 230-N may include wireless transceivers 233-1 to 233-N, respectively. The mobile devices 230-1 to 230-N may be communicatively coupled to the server 220 through the wireless transceivers 233-1 to 233-N. The mobile devices 230-1 to 230-N may be communicatively coupled to the server 220, for example, via the Internet or other wireless communication protocol. Accordingly, the mobile devices 230-1 to 230-N may continuously receive data from and transmit data to the server 220.

Each of the mobile devices 230-1 to 230-N may include a display panel, a camera, a microphone, a speaker, a GPS tracking device, an accelerometer, a gyroscope, a motion detecting sensor, and the like.

The mobile devices 230-1 to 230-N may include display panels 235-1 to 235-N, respectively.

Each of the mobile devices 230-1 to 230-N, may run a program stored in it. The program may perform the operations of the method of POI load balancing described with reference to FIGS. 3A and 3B.

In an exemplary embodiment of the present invention, the program stored in a mobile device, from among the mobile devices 230-1 to 230-N, may retrieve (e.g., download) the list of POIs 210, the load profile data for POIs 212, and the incentives 214 from the server 220 and store them in the mobile device. In an exemplary embodiment of the present invention, the program stored in the mobile device, from among the mobile devices 230-1 to 230-N, may continuously update the list of POIs 210, the load profile data for POIs 212, and the incentives 214 by downloading the updated list of POIs 210, the load profile data for POIs 212, and the incentives 214 from the server 220 in real-time, or it may update them at given time intervals, for example, every hour, two hours, four hours, one day, or the like. In addition, the program may query the user for permission to update the list of POIs 210, the load profile data for POIs 212, and the incentives 214, or the program may update the list of POIs 210, the load profile data for POIs 212, and the incentives 214 when desired by the user.

When the program determines that the user is not traveling toward the location of the incentive for the second POI, the server 220 cancels the incentive for the second POI. This may be done by the program sending data to the server 220 indicating that the user of the mobile device is not traveling toward the location of the incentive for the second POI. Accordingly, the user of the mobile device, from among the mobile devices 230-1 to 230-N is unable to use the incentive for the second POI. In addition, the server 220 may create a user profile for a mobile device, from among the mobile devices 230-1 to 230-N, including POI locations visited and durations of stay at each respective POI.

In an exemplary embodiment of the present invention, after downloading the program stored in the mobile device from the server 220, a user may use the program stored in his or her mobile device, from among the mobile devices 230-1 to 230-N, to monitor the position of the user's mobile device using the GPS tracking device of the his or her mobile device or by triangulation, determine the arrival of the user's mobile device at a first POI, and determine a duration of the mobile device's stay at the first POI. The program may determine when the duration of stay of the mobile device at the first POI exceeds the preset time threshold for the first POI, determine whether to offer an incentive to the user of the mobile device in which the program is running and present an incentive for a second POI to the user upon exceeding the preset time threshold for the first POI. The program may query the user for acceptance of the incentive for the second POI, receive input from the user regarding the user's acceptance of the incentive for the second POI and provide directions to the location of the incentive for the second POI. The program may monitor the position of the user's mobile device, determine if the user is traveling toward the location of the incentive for the second POI and maintain the acceptance valid when the user travels toward the location of the incentive for the second POI. The program may allow the user to reap the benefits of the incentive when the user arrives at the location of the incentive for the second POI, as described with reference to method of POI load balancing. This is so because once downloaded, the program stored in a mobile device includes the list of POIs 210, the load profile data for POIs 212, and the incentives 214 for the area where the user is located. Accordingly, once downloaded in a user's mobile device, the program may perform the above-mentioned operations without further communication with the server 220.

When the program determines that the user is not traveling toward the location of the incentive for the second POI, the program cancels the incentive for the second POI.

However, the program may communicate with the server to download an updated list of POIs 210, updated load profile data for POIs 212, and updated incentives 214.

In an exemplary embodiment of the present invention, when the program determines that the user is not traveling toward the location of the incentive for the second POI, the server 220 cancels the incentive for the second POI. This may be done by the program sending data to the server 220 indicating that the user of the mobile device is not traveling toward the location of the incentive for the second POI. Accordingly, the user of the mobile device, from among the mobile devices 230-1 to 230-N is unable to use the incentive for the second POI.

In an exemplary embodiment of the present invention, the server 220 creates a user profile for a mobile device, from among the mobile devices 230-1 to 230-N. The user profile created by the server 220 includes POIs visited by a mobile device, from among the mobile devices 230-1 to 230-N, and how long the mobile device stayed at each POI. In an exemplary embodiment of the present invention, the program running in a user's mobile device, from among the mobile devices 230-1 to 230-N, creates a user profile for the user's mobile device. The user profile created by the program includes POIs visited by the user's mobile device and how long the user's mobile device stayed at each POI.

When sending an incentive to a user, the mobile device of the user, which corresponds to one of the mobile devices 230-1 to 230-N, may alert the user by vibrating, sounding an alarm or other sound, by audibly reading the content of the incentive to the user by using a speaker included in the mobile device, or by a combination of vibrating, sounding the alarm, and reading the content of the incentive.

Each of the display panels 235-1 to 235-N may be touch panels. The display panels 235-1 to 235-N may display incentives sent to the respective users. The user may accept or reject the offered incentive by touching the display panel of his or her mobile device, or by pressing or sliding a button included in his or her mobile device, which is one of the mobile devices 230-1 to 230-N. In addition, directions to a location of an accepted incentive may be displayed to a user on the display panel of his or her mobile device.

For example, a user of the mobile device 230-1 may be offered an incentive which is displayed in the display panel 235-1. The user of the mobile device 230-1 may accept or reject the incentive by touching the display panel 235-1 or by pressing or sliding a button included in the mobile device 230-1.

In an exemplary embodiment of the present invention, a system for POI load balancing includes only one mobile device, for example, the mobile device 230-1.

In an exemplary embodiment of the present invention, a program stored in the server 220 may continuously update the list of POIs 210, the load profile data for POIs 212, and the incentives 214 or it may update them at given time intervals, for example, every hour, two hours, four hours, one day, or the like. In addition, the program stored in the server 220 may determine the arrival of a mobile device at a POI by tracking the GPS location or by triangulating the location of a mobile device, from among the mobile devices 230-1 to 230-N.

The program running in the server 220 may determine a duration of a mobile device's, for example, the mobile device 230-1, stay at a POI by receiving GPS location coordinates of the mobile device 230-1 from the mobile device 230-1. The server 220 may create a user profile including POIs visited and time spent at each POI by the mobile device 230-1, determine when the duration of stay of the mobile device 230-1 at the POI exceeds the preset time threshold for that POI, determine whether to offer an incentive to a user of the mobile device 230-1, and send the incentive to the user. The incentive may be displayed in the display panel 235-1 of the mobile device 230-1. A program stored in the mobile device 230-1 may query the user for acceptance of the incentive. The user's answer may be transmitted from the mobile device 230-1 to the server 220 using the wireless transceiver 233-1.

When the user of the mobile device 230-1 accepts the incentive, the acceptance of the incentive is transmitted to the server 220 and the program running in the server 220 may determine directions for the user to get to the location of the accepted incentive, determine if the user is traveling toward the location of the incentive, maintain the acceptance valid when the user travels toward the location of the incentive, and allow the user to reap the benefits of the incentive when the user arrives at the location of the incentive, as described with reference to method of POI load balancing.

It is understood that the description of the system for POI load balancing with reference to the mobile device 230-1 is merely exemplary. The system for POI load balancing of FIG. 4 may be applied to a plurality of mobile devices located in a plurality of regions, wherein each region of the plurality of regions includes a plurality of POIs. Accordingly, a plurality of users located in a region that includes a plurality of POIs may receive different incentives at different times on their mobile devices.

In an exemplary embodiment of the present invention, the system for POI load balancing of FIG. 4 may distribute the load between a plurality of POIs of a particular region by offering incentives aimed to encourage users located in crowded POI to go to less crowded POIs. In an exemplary embodiment of the present invention, the system for POI load balancing of FIG. 4 may reduce the loads of crowded POIs by offering incentives to the users located in the crowded POIs that encourage the users located in the crowded POIs to go elsewhere, for example, to a store, bar, café, restaurant, or the like.

It is understood that the present invention is not limited to tourism. The present invention may be applied to any field where load balancing can be achieved by incentivizing users to move from a crowded area to a less crowded area. For example, the POIs may be stores located in a mall, parking lots, public places, rooms of a museum, different locations of a park, and the like. Accordingly, users of the crowded stores, parking lots, public places, rooms of the museum, locations of the park, and the like, may be incentivized to move to less crowded parking lots, public places, rooms in the museum, locations in the park, and the like, by receiving incentives in their respective mobile devices.

Figure 5:
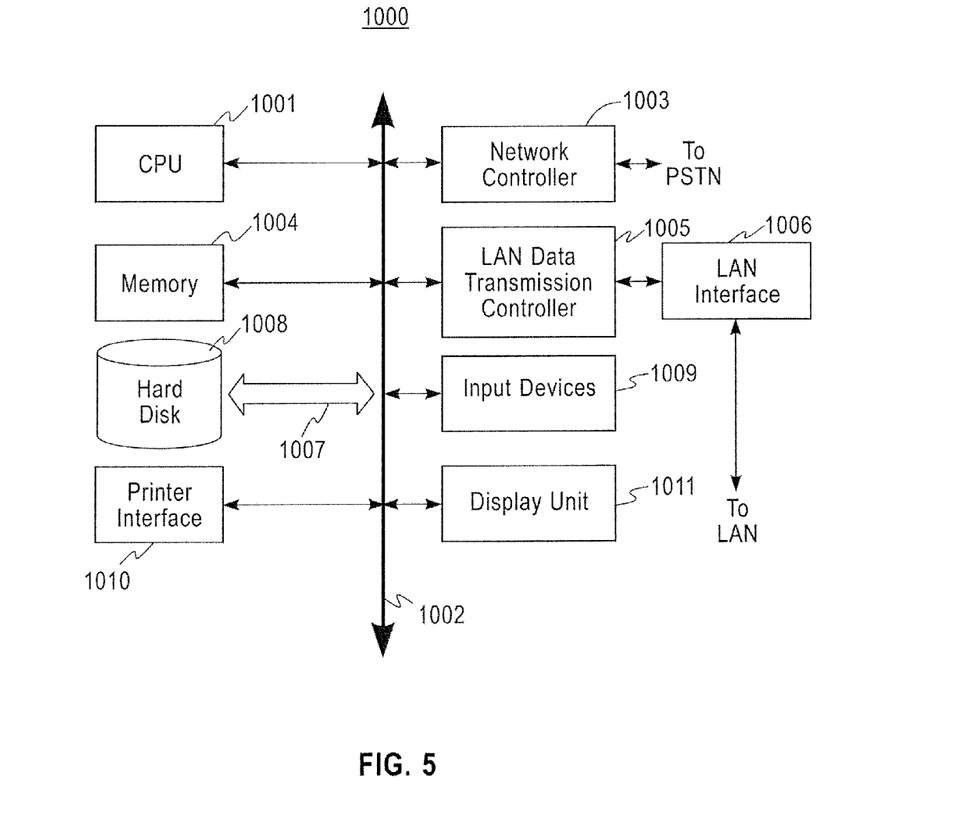
FIG. 5 illustrates an example of a computer system capable of implementing the method and apparatus according to embodiments of the present disclosure.

FIG. 5 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of operating a system for point of interest (POI) load balancing including a server and a mobile device for distributing loads across POIs, the method comprising:

storing, by the server or the mobile device, load profile data of a plurality of POIs within a predetermined geographical area;

monitoring, by the server, a position of a mobile device using global positioning system (GPS) tracking;

determining, by the server an arrival of the mobile device at a first POI of the plurality of POIs;

measuring, by the server, a duration of stay of the mobile device at the first POI;

determining, by the server, whether the duration of stay of the mobile device at the first POI exceeds a preset time threshold for the first POI; and sending, by the server, an incentive for a second POI of the plurality of POIs to the mobile device upon the duration of stay of the mobile device exceeding the preset time threshold for the first POI, wherein the second POI is in a different location than the first POI, the incentive is a predetermined offer for goods or services for the second POI, when a user of the mobile device applies the incentive for the second POI, a load of the first POI is reduced, the load of the first POI is a current occupancy of the first POI, the current occupancy of the first POI is a total number of persons present at the first POI at a current time, validity of the incentive is determined based on monitoring the position of the mobile device using GPS tracking, when the incentive is valid, the user is able to apply the incentive for the second POI, when the incentive is invalid, the user is unable to apply the incentive for the second POI, the GPS tracking determines a position of the first POI, a position of the second POI, and the position of the mobile device, when a difference between the position of the mobile device and the position of the second POI decreases, the incentive remains valid, and when a difference between the position of the mobile device and the position of the second POI increases, the incentive is invalidated by the server.

2. The method of claim 1, wherein the position of the mobile device is monitored to determine if the mobile device is traveling to the second POI.

3. The method of claim 2, wherein the incentive for the second POI is canceled if the mobile device stays at the first POI.

4. The method of claim 1, wherein a user profile of the mobile device is created, wherein the user profile of the mobile device includes POI locations visited by the mobile device and durations of stay of the mobile device at each of the POI locations visited.

5. The method of claim 4, wherein the incentive for the second POI is based on the user profile of the mobile device.

6. The method of claim 1, wherein the load profile data of the plurality of POIs includes load conditions at different times of a day at respective POIs of the plurality of POIs.

7. The method of claim 1, wherein the load profile data of the plurality of POIs is stored at the mobile device.

8. The method of claim 1, wherein the load profile data of the plurality of POIs is stored at the server.

9. The method of claim 8, wherein the load profile data of the plurality of POIs is updated at the remote server and the updated load profile data of the plurality of POIs is transmitted to the mobile device.

10. The method of claim 8, wherein the load profile data of the plurality of POIs is updated at the remote server and sending the incentive for a second POI of the plurality of POIs to the mobile device is based on the updated load profile data of the plurality of POIs.

11. A system for POI load balancing, comprising:
a mobile device comprising:
  a processor;
  a display;
  a global positioning system (GPS) tracking device;
  a wireless transceiver; and
  a stored program having codes executable by the processor to:
    determine, by the GPS tracking device, a current position of the mobile device, using GPS tracking;
    determine an arrival of the mobile device at a first POI;
    measure a duration of stay of the mobile device at the first POI;
    determine whether the duration of stay of the mobile device at the first POI exceeds a preset time threshold for the first POI; and
    present at a display of the mobile device an incentive for a second POI in a different geographical location than the first POI, upon the duration of stay of the mobile device exceeding the preset time threshold for the first POI, wherein the incentive is a predetermined offer for goods or services at the second POI; and
a server comprising:
  a memory that stores load profile data of a plurality of POIs;
  a processing device that updates the load profile data of the plurality of POIs; and
  a communicator that communicates with the wireless transceiver of the mobile device and transmits an incentive for a second POI to the mobile device based on the updated load profile data of the plurality of POIs,
wherein when a user of the mobile device applies the incentive for the second POI, a load of the first POI is reduced,
the load of the first POI is a current occupancy of the first POI,
the current occupancy of the first POI is a total number of persons present at the first POI at a current time,
validity of the incentive is determined based on the current position of the mobile device,
when the incentive is valid, the user is able to apply the incentive for the second POI,
when the incentive is invalid, the user is unable to apply the incentive for the second POI,
the GPS tracking determines a position of the first POI, a position of the second POI, and the current position of the mobile device,
when a difference between the current position of the mobile device and the position of the second POI decreases, the incentive remains valid, and
when a difference between the current position of the mobile device and the position of the second POI increases, the incentive is invalidated by the server.

12. The system of claim 11, wherein the stored program further monitors the current position of the mobile device to determine if the mobile device is traveling to the second POI.

13. The system of claim 12, wherein the server cancels the incentive for the second POI if the mobile device stays at the first POI.

14. The system of claim 11, wherein the server creates a user profile of the mobile device, wherein the user profile of the mobile device includes POI locations visited by the mobile device and durations of stay of the mobile device at each of the POI locations visited.

15. The system of claim 11, wherein the load profile data of the plurality of POIs includes load conditions at different times of a day at respective POIs of the plurality of POIs.

16. A non-transitory, tangible, program storage medium, embodying a stored program executable by a processor in a mobile device to perform a method of POI load balancing, the method of POI load balancing comprising:

storing load profile data of a plurality of POIs within a predetermined geographical area;
monitoring a current position of the mobile device, using global positioning system (GPS) tracking;
determining an arrival of the mobile device at a first POI;
measuring a duration of stay of the mobile device at the first POI;
determining whether the duration of stay of the mobile device at the first POI exceeds a preset time threshold for the first POI; and
presenting an incentive for a second POI at a display of the mobile device upon the duration of stay of the mobile device exceeding the preset time threshold for the first POI,
wherein the second POI is in a different location than the first POI,
the incentive is a predetermined offer for goods or services for the second POI,
when a user of the mobile device applies the incentive for the second POI, a load of the first POI is reduced,
the load of the first POI is a current occupancy of the first POI,
the current occupancy of the first POI is a total number of persons present at the first POI at a current time,
validity of the incentive is determined based on monitoring the current position of the mobile device using GPS tracking;
when the incentive is valid, the user is able to apply the incentive for the second POI,
when the incentive is invalid, the user is unable to apply the incentive for the second POI,
the GPS tracking determines a position of the first POI, a position of the second POI, and the current position of the mobile device,
when a difference between the current position of the mobile device and the position of the second POI decreases, the incentive remains valid, and
when a difference between the current position of the mobile device and the position of the second POI increases, the incentive is invalidated.

17. The non-transitory, tangible, program storage medium of claim 16, wherein the method of POI load balancing includes communicating with a server to download updated POI data.

18. The non-transitory, tangible, program storage medium of claim 16, wherein the method of POI load balancing includes canceling the incentive for the second POI if the mobile device stays at the first POI.

19. The non-transitory, tangible, program storage medium of claim 16, wherein the method of POI load balancing includes creating a user profile of the mobile device, wherein the user profile of the mobile device includes POI locations visited by the mobile device and durations of stay of the mobile device at each of the POI locations visited, and
wherein presenting the incentive for the second POI is based on the user profile of the mobile device.

20. The non-transitory, tangible, program storage medium of claim 16, wherein the stored load profile data of the plurality of POIs includes load conditions at different times of a day at respective POIs of the plurality of POIs.

* * * * *